US012676853B2

(12) United States Patent
McGee et al.

(10) Patent No.: US 12,676,853 B2
(45) Date of Patent: Jul. 7, 2026

(54) USER IDENTIFICATION WITH INPUT PROFILE RECORD

(71) Applicant: MASTERCARD TECHNOLOGIES CANADA ULC, Vancouver (CA)

(72) Inventors: Perry McGee, Vancouver (CA); Sik Suen Chan, Richmond (CA); Anton Laptiev, Vancouver (CA); Cristian Frentiu, Port Coquitlam (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 718 days.

(21) Appl. No.: 17/490,358

(22) Filed: Sep. 30, 2021

(65) Prior Publication Data

US 2022/0103548 A1     Mar. 31, 2022

Related U.S. Application Data

(60) Provisional application No. 63/085,598, filed on Sep. 30, 2020.

(51) Int. Cl.
*H04L 9/40*          (2022.01)

(52) U.S. Cl.
CPC ...... *H04L 63/0861* (2013.01); *H04L 63/0435* (2013.01); *H04L 63/0838* (2013.01)

(58) Field of Classification Search
None
See application file for complete search history.

(56) References Cited

U.S. PATENT DOCUMENTS

| | | | |
|---|---|---|---|
| 4,805,222 A | 2/1989 | Young et al. | |
| 7,706,574 B1 | 4/2010 | Ross | |
| 9,185,095 B1 | 11/2015 | Moritz et al. | |
| 9,516,035 B1 | 12/2016 | Moritz et al. | |
| 10,453,060 B2 * | 10/2019 | Kohli ................... | G06Q 20/425 |

(Continued)

FOREIGN PATENT DOCUMENTS

| | | |
|---|---|---|
| WO | 9723816 A1 | 7/1997 |
| WO | 2013006071 A1 | 1/2013 |

OTHER PUBLICATIONS

European Patent Office Extended European Search Report for Application No. 21873770.8, dated May 6, 2024 (9 pages).

(Continued)

*Primary Examiner* — Piotr Poltorak
(74) *Attorney, Agent, or Firm* — Michael Best & Friedrich LLP

(57) ABSTRACT

User identification with an input profile record (IPR). In one embodiment, a server includes a memory and an electronic processor. The electronic processor is configured to receive a plurality of input profile records (IPRs) associated with a first user, the plurality of IPRs each based on a plurality of user inputs and indicative of identity of the first user, control the memory to store the plurality of IPRs in the input profile record repository, receive a current IPR associated with a second user, determine whether the second user is the first user by comparing a first one or more biometric features based on the plurality of IPRs and a second one or more biometric features based on the current IPR, and responsive to determining that the second user is the first user, output an identity confirmation that the second user is the first user.

20 Claims, 8 Drawing Sheets

(56) References Cited

U.S. PATENT DOCUMENTS

| | | | | |
|---|---|---|---|---|
| 10,693,650 | B2 * | 6/2020 | Wease | H04L 9/3242 |
| 10,699,275 | B2 * | 6/2020 | Allen | G06Q 20/102 |
| 11,303,631 | B1 * | 4/2022 | Alexanian | G06V 40/50 |
| 2003/0110381 | A1 * | 6/2003 | Aoshima | H04L 63/0838 |
| | | | | 713/168 |
| 2004/0015714 | A1 | 1/2004 | Abraham et al. | |
| 2004/0148509 | A1 * | 7/2004 | Wu | H04L 9/0866 |
| | | | | 713/186 |
| 2004/0187037 | A1 | 9/2004 | Checco | |
| 2006/0224898 | A1 | 10/2006 | Ahmed | |
| 2006/0271790 | A1 | 11/2006 | Chen | |
| 2007/0067853 | A1 | 3/2007 | Ramsey | |
| 2008/0306872 | A1 * | 12/2008 | Felsher | G06Q 10/10 |
| | | | | 705/51 |
| 2012/0137340 | A1 | 5/2012 | Jakobsson et al. | |
| 2013/0055381 | A1 | 2/2013 | Hao et al. | |
| 2015/0095028 | A1 * | 4/2015 | Karpey | G10L 17/24 |
| | | | | 704/246 |
| 2015/0149244 | A1 * | 5/2015 | Unser | G06F 21/64 |
| | | | | 705/7.29 |
| 2015/0310444 | A1 | 10/2015 | Chen et al. | |
| 2015/0363785 | A1 * | 12/2015 | Perez | G06Q 20/20 |
| | | | | 705/44 |
| 2016/0180068 | A1 * | 6/2016 | Das | H04L 63/0861 |
| | | | | 726/7 |
| 2017/0140141 | A1 | 5/2017 | Yan et al. | |
| 2018/0034859 | A1 | 2/2018 | Aronowitz et al. | |
| 2018/0096354 | A1 | 4/2018 | Kohli | |
| 2019/0156345 | A1 | 5/2019 | Chen et al. | |
| 2019/0220583 | A1 | 7/2019 | Douglas et al. | |
| 2020/0004939 | A1 | 1/2020 | Streit | |
| 2020/0014702 | A1 | 1/2020 | Dasgupta et al. | |
| 2020/0044851 | A1 | 2/2020 | Everson et al. | |
| 2020/0044852 | A1 | 2/2020 | Streit | |
| 2020/0134145 | A1 | 4/2020 | Bapst et al. | |
| 2020/0334347 | A1 | 10/2020 | Hoyos et al. | |
| 2022/0103548 | A1 * | 3/2022 | McGee | H04L 63/0435 |

OTHER PUBLICATIONS

European Patent Office Extended European Search Report for Application No. 21873771.6, dated Apr. 26, 2024 (9 pages).
International Search Report and Written Opinion for Application No. PCT/CA2021051365 dated Dec. 10, 2021 (14 pages).
International Search Report and Written Opinion for Application No. PCT/CA2021/051366 dated Dec. 8, 2021 (11 pages).

* cited by examiner

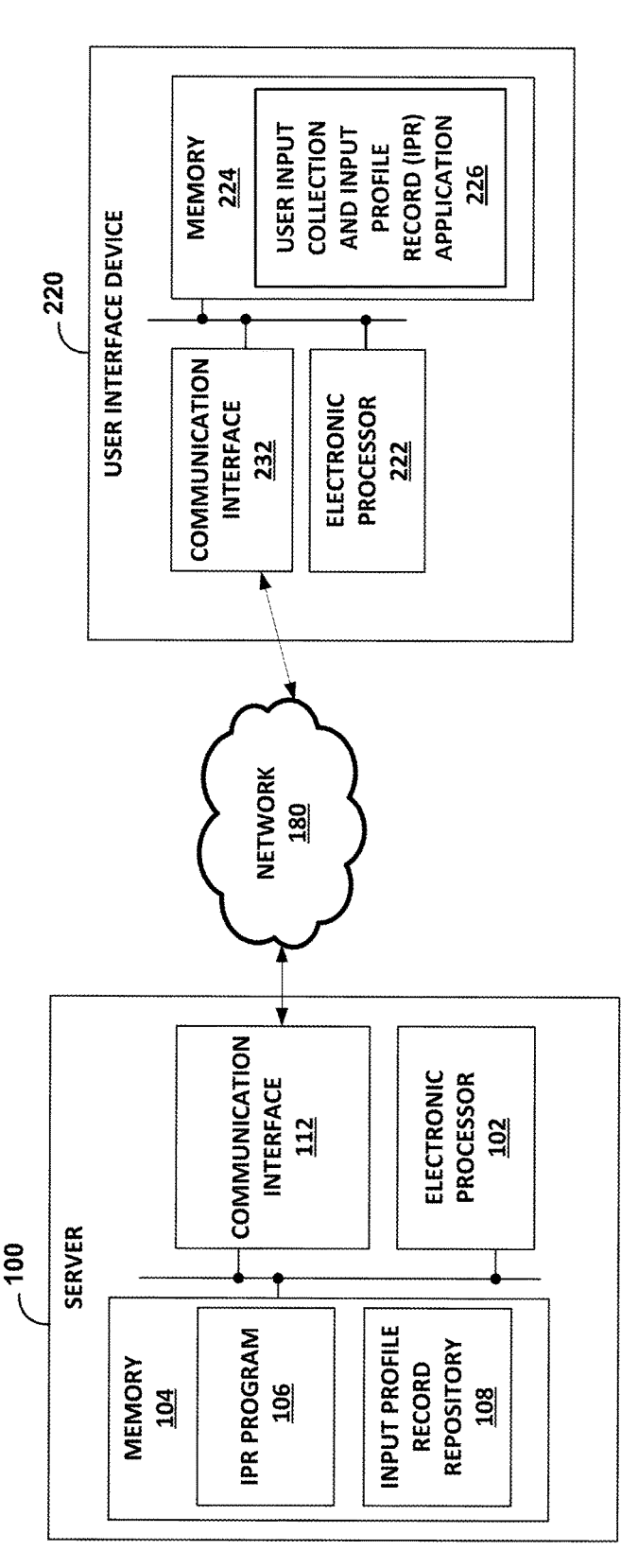
FIG. 2

Figure 5:
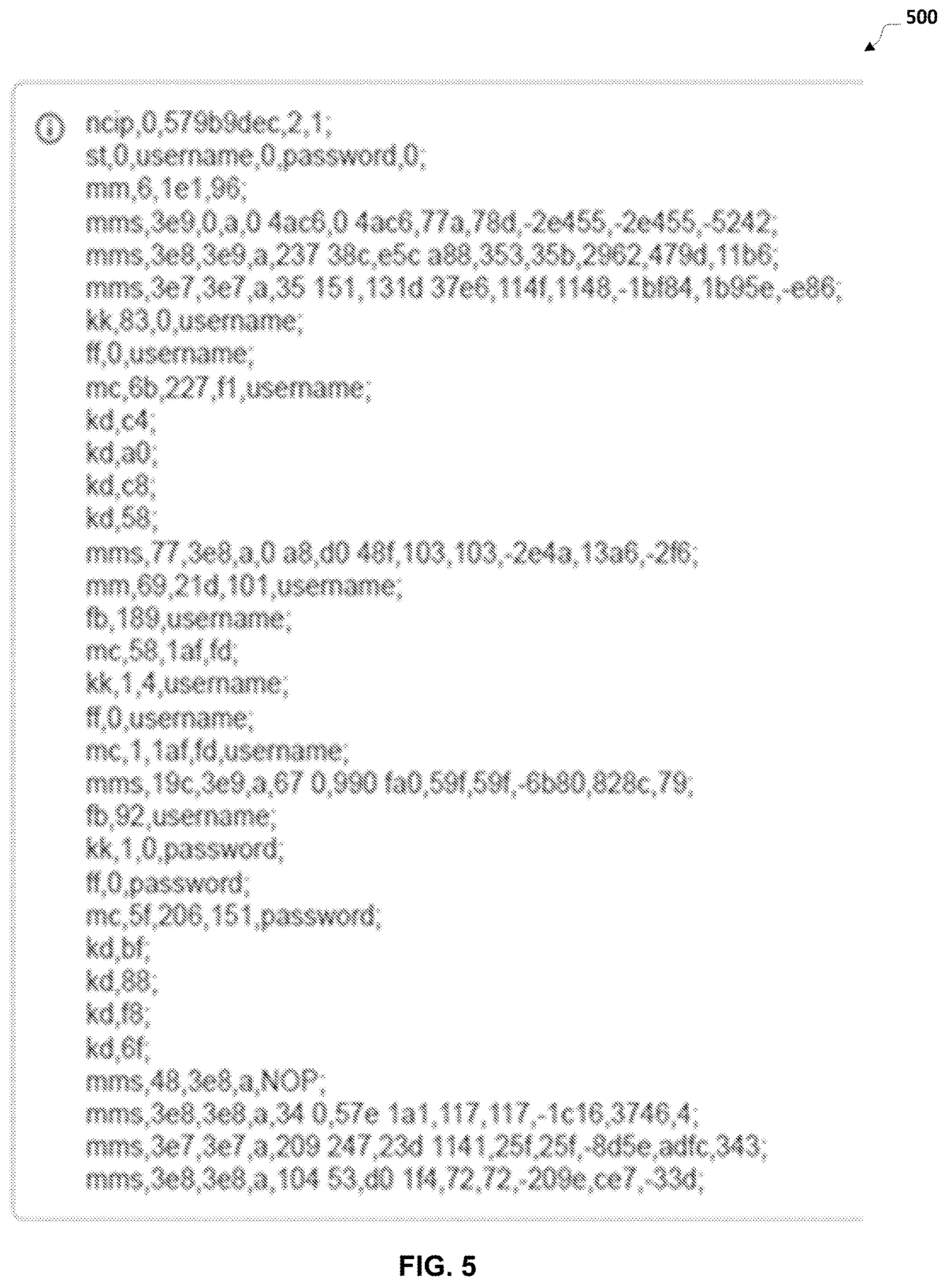

```
ncip,0,579bb8dec,2,1;
st,0,username,0,password,0;
mm,6,1e1,98;
mms,3e9,0,a,0 4ac6,0 4ac6,77a,78d,-2e455,-2e455,-5242;
mms,3e8,3e8,a,237 38c,e5c a88,353,35b,2862,479d,11b6;
mms,3e7,3e7,a,35 151,131d 37e6,114f,1148,-1bf84,1b95e,-e86;
kk,83,0,username;
ff,0,username;
mc,6b,227,f1,username;
kd,c4;
kd,a0;
kd,c8;
kd,58;
mms,77,3e8,a,0 a8,d0 48f,103,103,-2e4a,13a6,-2f6;
mm,69,21d,101,username;
fb,189,username;
mc,58,1af,fd;
kk,1,4,username;
ff,0,username;
mc,1,1af,fd,username;
mms,19c,3e9,a,67 0,990 fa0,59f,59f,-6b80,828c,79;
fb,92,username;
kk,1,0,password;
ff,0,password;
mc,5f,206,151,password;
kd,bf;
kd,88;
kd,f8;
kd,6f;
mms,48,3e8,a,NOP;
mms,3e8,3e8,a,34 0,57e 1a1,117,117,-1c16,3746,4;
mms,3e7,3e7,a,209 247,23d 1141,25f,25f,-8d5e,adfc,343;
mms,3e8,3e8,a,104 53,d0 114,72,72,-209e,ce7,-33d;
```

USER IDENTIFICATION WITH INPUT PROFILE RECORD

CROSS-REFERENCE TO RELATED APPLICATION

This application claims the benefit of U.S. Provisional Application No. 63/085,598, filed on Sep. 30, 2020, the entire contents of which are hereby incorporated by reference.

FIELD

The present disclosure relates generally to user identification. More specifically, the present disclosure relates to user identification with an input profile record.

BACKGROUND

Conventionally, user identification occurs in a variety of different ways. For example, a user may be identified with individual or combinations of distinctive biometrics that are associated with the user. In a different example, a user may be identified after receiving a one-time password to a registered user device associated with the user.

SUMMARY

However, several problems exist with conventional user identification. One problem is that conventional identification only occurs at certain points in time (e.g., turning on a smartphone). Another problem is that conventional biometric identification is fixed to the initial biometric used to set up the user identification.

The present disclosure improves upon the conventional user identification and solves the aforementioned problems by performing user identification with an input profile record (IPR). The input profile record is based on a plurality of user inputs of a user and the input profile record changes over time. The input profile record may then be continuously used to identify the user's use of any device over time. Further, the addition of IPR events like key-up, and mobile sensors (i.e. acceleration, orientation and rotation etc.), derivation of biometric features from the generated IPRs, and identifying the "right" balance between IPR size, sampling frequency resolution and effectiveness of data capture are all improvements over the conventional user identification.

One example of the present disclosure includes a server for user identification. The server includes a memory and an electronic processor in communication with the memory. The memory including an input profile record repository. The electronic processor is configured to receive a plurality of input profile records (IPRs) associated with a first user, the plurality of input profile records each based on a plurality of user inputs and indicative of identity of the first user, control the memory to store the plurality of IPRs in the input profile record repository, receive a current IPR associated with a second user, determine whether the second user is the first user by comparing a first one or more biometric features based on the plurality of IPRs and a second one or more biometric features based on the current IPR, and responsive to determining that the second user is the first user, output an identity confirmation that the second user is the first user.

Another example of the present disclosure includes a method for user identification. The method includes receiving, with the electronic processor, a plurality of input profile records (IPRs) associated with a first user, the plurality of input profile records each based on a plurality of user inputs and indicative of identity of the first user. The method includes controlling, with the electronic processor, a memory to store the plurality of IPRs in an input profile record repository. The method includes receiving, with the electronic processor, a current IPR associated with a second user. The method includes determining, with the electronic processor, whether the second user is the first user by comparing a first one or more biometric features based on the plurality of IPRs and a second one or more biometric features based on the current IPR. The method also includes responsive to determining that the second user is the first user, outputting, with the electronic processor, an identity confirmation that the second user is the first user.

Yet another example of the present disclosure includes a system. The system includes a user interface device and a server. The user interface device is configured to output a plurality of input profile records (IPRs) associated with a first user, the plurality of input profile records each based on a plurality of user inputs and indicative of identity of the first user. The server includes a memory including an input profile record repository and an electronic processor in communication with the memory. The electronic processor is configured to receive the plurality of IPRs, control the memory to store the plurality of IPRs in the input profile record repository, receive a current IPR associated with a second user, determine whether the second user is the first user by comparing a first one or more biometric features based on the plurality of IPRs and a second one or more biometric features based on the current IPR, and responsive to determining that the second user is the first user, output an identity confirmation that the second user is the first user.

BRIEF DESCRIPTION OF THE DRAWINGS

FIG. 2 is a block diagram illustrating a second system with user identification based on an input profile record, in accordance with various aspects of the present disclosure.

FIG. 4 is a diagram illustrating an example of an input profile record (IPR), in accordance with various aspects of the present disclosure.

FIG. 5 is a diagram illustrating a second example of the IPR, in accordance with various aspects of the present disclosure.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
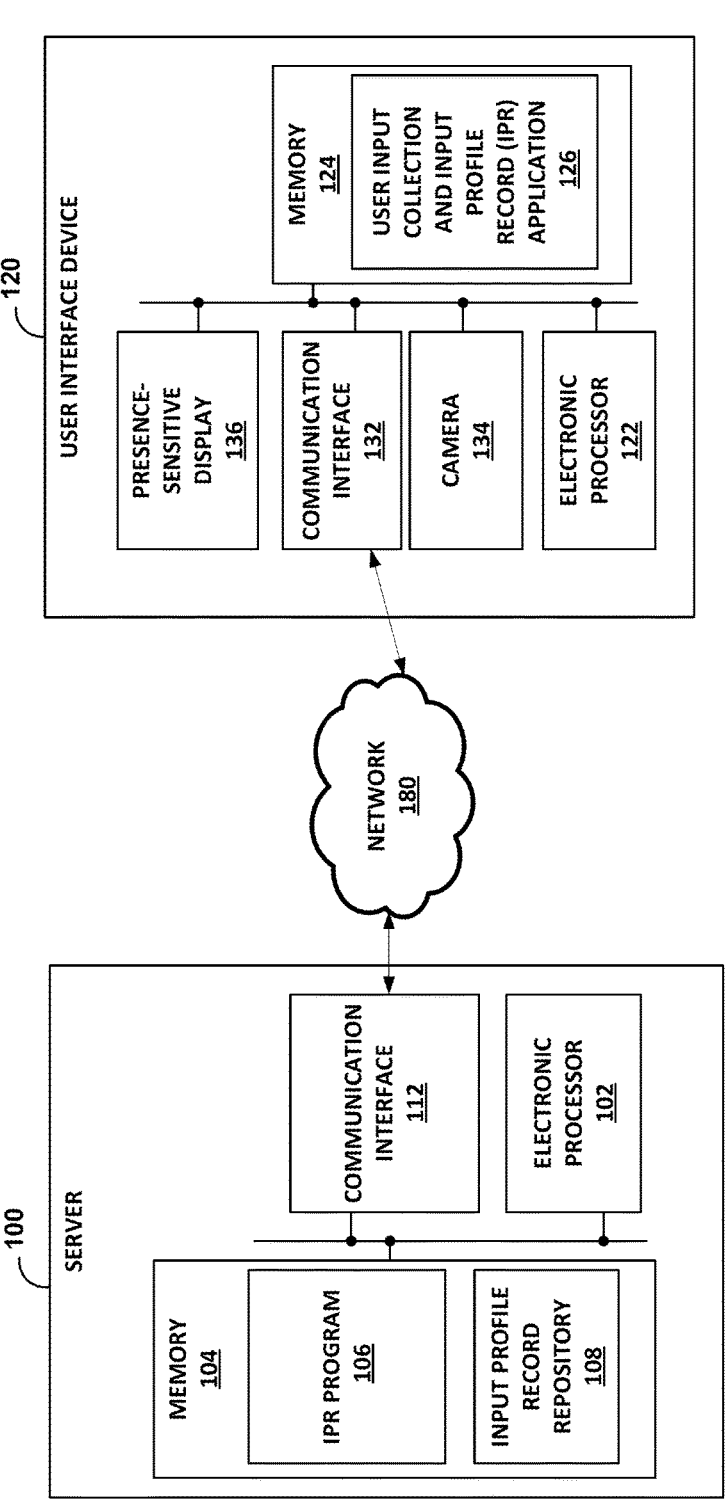
FIG. 1 is a block diagram illustrating a system with user identification based on an input profile record, in accordance with various aspects of the present disclosure.

FIG. 1 is a block diagram illustrating a system 10 with user identification based on an input profile record, in accordance with various aspects of the present disclosure. It should be understood that, in some embodiments, there are different configurations from the configuration illustrated in FIG. 1. The functionality described herein may be extended to any number of servers providing distributed processing.

In the example of FIG. 1, the system 10 includes a server 100, a user interface device 120, and a network 180. The server 100 includes an electronic processor 102 (for example, a microprocessor or another suitable processing device), a memory 104 (for example, a non-transitory computer-readable storage medium), and a communication interface 112. It should be understood that, in some embodiments, the server 100 may include fewer or additional components in configurations different from that illustrated in FIG. 1. Also, the server 100 may perform additional functionality than the functionality described herein. In addition, the functionality of the server 100 may be incorporated into other servers. As illustrated in FIG. 1, the electronic processor 102, the memory 104, and the communication interface 112 are electrically coupled by one or more control or data buses enabling communication between the components.

The electronic processor 102 executes machine-readable instructions stored in the memory 104. For example, the electronic processor 102 may execute instructions stored in the memory 104 to perform the functionality described herein.

The memory 104 may include a program storage area (for example, read only memory (ROM)) and a data storage area (for example, random access memory (RAM), and other non-transitory, machine-readable medium). In some examples, the program storage area may store machine-executable instructions regarding an input profile record (IPR) program 106. In some examples, the data storage area may store data regarding an input profile record repository 108.

The IPR program 106 causes the electronic processor 102 to collect and store input profile records in the input profile record repository 108. Specifically, the IPR program 106 causes the electronic processor 102 to parse the IPR content received from a user interface device, determine biometric features based on the current IPR and historical/older IPRs associated with the user, and perform user identification using a biometric identification algorithm that compares current biometrics features based on a current IPR to the historical biometric features based on a set of historical IPRs. In some examples, a successful user identification may require ten historical IPRs associated with the user to establish a "user profile."

The IPR program 106 also causes the electronic processor 102 to update an input profile record stored in the input profile record repository 108. Additionally, the user identification with the IPRs is a "passive" identification that does not need to query a user for additional information.

In examples, the input profile record repository 108 is a central repository including a plurality of input profile records. Each input profile record is associated with a specific user (e.g., a user account) and/or a specific user interface device. An input profile record stored in the input profile record repository 108 is updated periodically with the IPR program 106 as described above. The input profile record associated with the user interface device 120 is indicative of an identity of a user over a specific period of time. In other words, the input profile record as described herein solves the aforementioned problems with user identification because the input profile record is a dynamic identification of a user over a specific period of time rather than occurring at certain points in time and fixed to an initial biometric used to set up the user identification.

For example, the biometric algorithm of the IPR program 106 includes a number of typing and sensor behavioral features as set forth in Tables 4-7 (also referred to as "biometric features") from the user inputs set forth in Tables 1-3 and 8 (i.e., events included in the IPR data construct). The maximum available sample rate (or data delay) is 16 milliseconds (ms), which means sensor data is recorded every 16 ms. However, as with a sample rate of 16 ms from the sensors, a size of the IPR exceeds an upload size threshold set forth in Appendix D (e.g., an upload size threshold of 20,000 bytes). Additionally, as described in Appendix D, the size of the IPR may be reduced below the upload size threshold by increasing the sample rate of some or all of the sensors (e.g., an increase to every 100 ms and/or an increase to every 50 ms), which means a balance between a lower size of recorded data (e.g., the IPR) with lower frequency, less accuracy, and a lower number of samples from some or all of the sensors.

The communication interface 112 receives data from and provides data to devices external to the server 100, such as an input profile record (IPR) from the user interface device 120 via the network 180. For example, the communication interface 112 may include a port or connection for receiving a wired connection (for example, an Ethernet cable, fiber optic cable, a telephone cable, or the like), a wireless transceiver, or a combination thereof. In some examples, the network 180 is the Internet.

In the example of FIG. 1, the user interface device 120 includes an electronic processor 122 (for example, a microprocessor or another suitable processing device), a memory 124 (for example, a non-transitory computer-readable storage medium), a communication interface 132, a camera 134, and a presence-sensitive display 136. In some examples, the user interface device may be a smartphone, tablet, laptop, or other suitable user interface device with a presence-sensitive display. As illustrated in FIG. 1, the electronic processor 122, the memory 124, the communication interface 132, the camera 134, and the presence-sensitive display 136 are electrically coupled by one or more control or data buses enabling communication between the components.

The electronic processor 122 executes machine-readable instructions stored in the memory 124. For example, the electronic processor 122 may execute instructions stored in the memory 124 to perform the functionality described herein.

The memory 124 may include a program storage area (for example, read only memory (ROM)) and a data storage area (for example, random access memory (RAM), and other non-transitory, machine-readable medium). The program storage area includes a user input collection and input profile record (IPR) application 126. In some examples, the user input collection and IPR application 126 may be a stand-alone application. In other examples, the user input collection and IPR application 126 is a feature that is part of a separate application (e.g., the user input collection and IPR application 126 may be included as part of a camera application, a banking application, or other suitable application).

The user input collection and IPR application 126 causes the electronic processor 122 to collect user inputs, i.e., user interactions, from a user relative to a mobile application (e.g., time to fill data field entries, use of specific autofill, or other suitable user inputs) of the user interface device 120 and generate an input profile record (IPR) based on the user inputs (also referred to as a "a mobile platform"). The user input collection and IPR program 106 may also cause the electronic processor 122 to collect user inputs at a particular website (e.g., time to fill data field entries, use of specific autofill, or other suitable user inputs) and generate (or update) the input profile record based on these user inputs (also referred to as a "web platform").

In some examples, the user input collection and IPR application 126 causes the electronic processor 122 to collect user inputs with respect to the presence-sensitive display 136 (e.g., type of keyboard, typing speed, use of patterns, or other suitable user inputs (see Tables 1-3)). In these examples, the user input collection and IPR application 126 may also cause the electronic processor 122 to output the generated IPR to the server 100 via the communication interface 132 and the network 180. Additionally, in some examples, the user input collection and IPR application 126 may cause electronic processor 122 to control the memory 124 to store the user inputs that are collected and/or the IPR that is generated for a period of time or until the generated IPR is output to the server 100.

In other examples, the user input collection and IPR application 126 causes the electronic processor 122 to collect user inputs with respect to the camera 134 (e.g., facial recognition, user gestures, or other suitable user inputs, which may be part of the mobile platform. In these examples, the user input collection and IPR application 126 may also cause the electronic processor 122 to generate (or update) an IPR based on the aforementioned user inputs and output the IPR to the server 100 via the communication interface 132 and the network 180. Additionally, in some examples, the user input collection and IPR application 126 may cause electronic processor 122 to control the memory 124 to store the user inputs that are collected and/or the IPR that is generated for a period of time or until the generated IPR is output to the server 100.

The communication interface 132 receives data from and provides data (e.g., generated IPR(s)) to devices external to the user interface device 120, i.e., the server 100. For example, the communication interface 132 may include a port or connection for receiving a wired connection (for example, an Ethernet cable, fiber optic cable, a telephone cable, or the like), a wireless transceiver, or a combination thereof.

The camera 134 includes an image sensor that generates and outputs image data of a subject. In some examples, the camera 134 includes a semiconductor charge-coupled device (CCD) image sensor, a complementary metal-oxide-semiconductor (CMOS) image sensor, or other suitable image sensor. The electronic processor 122 receives the image data of the subject that is output by the camera 134.

The presence-sensitive display 136 includes a display screen with an array of pixels that generate and output images. In some examples, the display screen is one of a liquid crystal display (LCD) screen, a light-emitting diode (LED) and liquid crystal display (LCD) screen, a quantum dot light-emitting diode (QLED) display screen, an interferometric modulator display (IMOD) screen, a micro light-emitting diode display screen (mLED), a virtual retinal display screen, or other suitable display screen. The presence-sensitive display 136 also includes circuitry that is configured to detect the presence of the user. In some examples, the circuitry is a resistive or capacitive panel that detects the presence of an object (e.g., a user's finger).

It should be understood that, in some embodiments, the server 100 may include fewer or additional components in configurations different from that illustrated in FIG. 1. Also, the server 100 may perform additional functionality than the functionality described herein. In addition, some of the functionality of the user interface device 120 (for example, the IPR generation) may be incorporated into other servers (e.g., incorporated into the server 100). Likewise, some of the functionality of the server 100 may be incorporated into the user interface device 120 (for example, the user identification).

To summarize, the user interface device 120 collects IPR data for each transaction at a mobile application or at a web page. From the raw IPR data, the server 100 may parse out a set of meaningful biometric features that differentiates same users from different users.

A passive biometric identification algorithm included in the IPR program 106 compares biometric feature values (from current IPR) to biometric feature values seen in the past (from historical IPRs), and when the current biometric feature values fall within a "reasonable" range of what is seen in the past, the server 100 may identify the user to be the same as a previous user. The passive biometric identification algorithm is an anomaly detection type of algorithm.

For the set of biometric feature values seen in the past IPRs, the set may be considered as a "training profile." In general, a minimum of two to ten and a maximum of ten to fifteen (i.e. rolling window of last X transactions) IPRs may be required to build profiles for comparison with the biometric identification algorithm. Each biometric feature may also contribute a different weight to the overall model prediction, where a biometric feature with higher predictability power would have a higher weight.

To return the "different user" identification confirmation, the server 100 may determine whether a biometric score is less than a lower threshold. To return the "same user" identification confirmation, the server 100 may determine whether a biometric score is greater than an upper threshold and the lower threshold. To return the "undetermined" identification confirmation, the server 100 may determine whether a biometric score is greater than the lower threshold and less than the upper threshold.

In some examples, the biometric identification algorithm returns a biometric score between 0 to 1, where closer to 1 means more likely a match. Additionally, in some examples, the upper and lower thresholds are set based on feedback data (i.e. confirmed fraudulent identifications) from clients such that the biometric identification algorithm accurately classifies all different users as no-matches to reduce or eliminate false positives.

FIG. 2 is a block diagram illustrating a second system 200 with user identification based on an input profile record, in accordance with various aspects of the present disclosure. It should be understood that, in some embodiments, there are different configurations from the configuration illustrated in FIG. 2. The functionality described herein may be extended to any number of servers providing distributed processing.

In the example of FIG. 2, the system 200 includes the server 100 as described above in FIG. 1 and a user interface device 220. Consequently, the description of the server 100 is not repeated below to avoid redundant descriptions. Additionally, the user interface device 220 is any electronic device that user may use to interface with the server 100. For example, the user interface device 200 may be a mouse, a keyboard, a desktop computer, or other suitable user interface device.

In the example of FIG. 2, the user interface device 220 includes an electronic processor 222 (for example, a microprocessor or another suitable processing device), a memory 224 (for example, a non-transitory computer-readable storage medium), and a communication interface 232.

It should be understood that, in some embodiments, the user interface device 220 may include fewer or additional components in configurations different from that illustrated in FIG. 2. Also, the user interface device 220 may perform additional functionality than the functionality described herein. As illustrated in FIG. 2, the electronic processor 222, the memory 224, and the communication interface 232 are electrically coupled by one or more control or data buses enabling communication between the components.

The electronic processor 222 executes machine-readable instructions stored in the memory 224. For example, the electronic processor 222 may execute instructions stored in the memory 224 to perform the functionality described herein.

The memory 224 may include a program storage area (for example, read only memory (ROM)) and a data storage area (for example, random access memory (RAM), and other non-transitory, machine-readable medium). For example, when the user interface device 220 is a desktop computer, the program storage area may include a user input collection and input profile record (IPR) application 226 that is similar to the user input collection and IPR application 126 as described above.

The communication interface 232 receives data from (e.g., IPR generation signal) and provides data (e.g., generated IPR(s)) to devices external to the user interface device 220, i.e., the server 100. For example, the communication interface 232 may include a port or connection for receiving a wired connection (for example, an Ethernet cable, fiber optic cable, a telephone cable, a universal serial bus (USB) cable, or other suitable wired connection), a wireless transceiver, or a combination thereof.

In the example of FIG. 2, the server 100 may send a command (e.g., the IPR generation signal) to the user interface device 220 to collect user input(s) from a user's interaction with the user interface device 220 for a specific period of time. For example, when the user interface device 220 is a computer mouse, the server 100 may send a command to the computer mouse to collect user input(s) from the user's interaction with the computer mouse for a specific period of time.

In the example of FIG. 2, the user input collection and IPR application 226 may also cause the electronic processor 222 to generate (or update) an IPR based on the aforementioned user input(s) and output the IPR to the server 100 via the communication interface 232 and the network 180. Additionally, in some examples, the user input collection and IPR application 226 may cause electronic processor 222 to control the memory 224 to store the user input(s) that are collected and/or the IPR that is generated for a period of time or until the generated IPR is output to the server 100.

Figure 3:
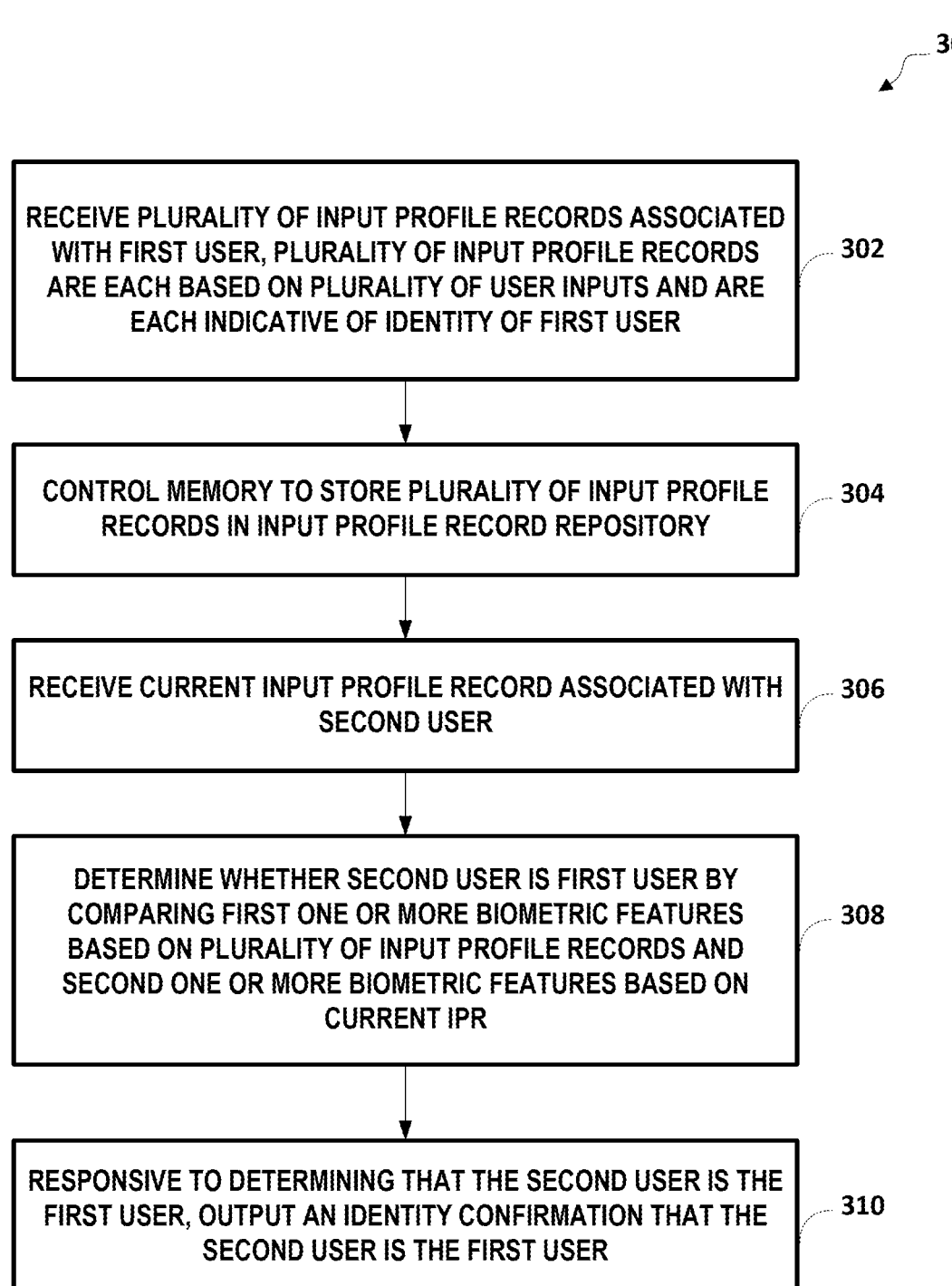
FIG. 3 is a flowchart illustrating a method for identifying a user, in accordance with various aspects of the present disclosure.

FIG. 3 is a flowchart illustrating a method 300 for identifying a user, in accordance with various aspects of the present disclosure. FIG. 3 is described with respect to the server 100 and the user interface device 120 of FIG. 1. However, FIG. 3 is equally applicable to the server 100 and the user interface device 220 of FIG. 2, although the server 100 controls the user interface device 220 to collect user inputs for a specific period of time.

The method 300 includes receiving, with an electronic processor, a plurality of input profile records (IPRs) associated with a first user, the plurality of IPRs are each based on a plurality of user inputs and are each indicative of an identity of the first user (at block 302). For example, the electronic processor 102 receives a plurality of input profile records associated with a first user, the plurality of input profile records are each based on the plurality of user inputs provided by the first user, and are each indicative of an identity of the first user of the user interface device 120.

The method 300 includes controlling, with the electronic processor, a memory to store the plurality of input profile records (IPRs) in an input profile record repository (at block 304). For example, the electronic processor 102 controls the memory 104 to store the IPRs that are received in the input profile record repository 108.

The method 300 includes receiving, with the electronic processor, a current input profile record (IPR) associated with a second user (at block 306). For example, the electronic processor 102 receives a current IPR associated with a current user of the user interface device 120 from the user interface device 120.

The method 300 includes determining, with the electronic processor and a biometric identification algorithm, whether the second user is the first user by comparing a first one or more biometric features based on the plurality of input profile records and a second one or more biometric features based on the current IPR (at block 308). For example, the electronic processor 102 determines whether the current user of the user interface device 120 is the first user of the user interface device 120 by comparing a first one or more biometric features based on the plurality of input profile records associated with the first user and a second one or more biometric features based on the current IPR associated with the second user.

The method 300 includes responsive to determining that the second user is the first user, outputting, with the electronic processor, an identity confirmation that the second user is the first user (at block 310). For example, the electronic processor 102 controls the communication interface 112 to output an identity confirmation that the current user of the user interface device 120 is the first user of the user interface device 120 to the user interface device 120 via the network 180 in response to the electronic processor 102 determining that the current user is the first user.

Alternatively, in some examples, the electronic processor 102 controls the communication interface 112 to output an identity confirmation that the current user of the user interface device 120 is the first user of the user interface device 120 to a second server or other computing device via the network 180 in response to the electronic processor 102 determining that the current user is the first user. In these examples, the second server or other computing device may have initiated the identification of the second user by requesting the server 100 to identify whether the first user is the second user.

In some examples, the current IPR may be from a second user interface device that is different from the user interface device. In these examples, the identity confirmation confirms the second user of the second user interface is the same as the first user of the user interface device.

Additionally, in some examples, in determining whether the second user is the first user by comparing the first one or more biometric features based on the plurality of IPRs and the second one or more biometric features based on the current IPR, the method 300 may further include generating, with a biometric identification algorithm, the first one or more biometric features from the plurality of IPRs, generating, with the biometric identification algorithm, the second one or more biometric features from the current IPR, generating, with the biometric identification algorithm, a biometric score based on difference between the second one or more biometric features and the first one or more biometric features, determining whether the biometric score is less than a lower threshold, determining whether the biometric score greater than the lower threshold and less than an upper threshold, and determining whether the biometric score is greater than the lower threshold and the upper threshold. In these examples, the second user is the first user when the biometric score is greater than the lower threshold and the upper threshold, the second user is not the first user when the biometric score is lower than the lower threshold and the upper threshold, and the second user is undetermined relative to the first user when the biometric score is higher than the lower threshold and lower than the upper threshold.

Additionally, in these examples, in generating, with the biometric identification algorithm, the first one or more biometric features from the plurality of IPRs and generating, with the biometric identification algorithm, the second one or more biometric features from the current IPR, the method 300 may further include determining a first one or more latencies of a first dwell time based on the plurality of IPRs, and determining a second one or more latencies of a second dwell time based on the current IPR.

In some examples, the plurality of IPRs and the current IPR may each include an IPR header and a plurality of IPR events. The plurality of IPR events includes a key down event and a key up event. The plurality of user inputs is a one-time-password (OTP) and each user input of the plurality of user inputs includes the key down event and the key up event associated with each key in the OTP.

Figure 4:
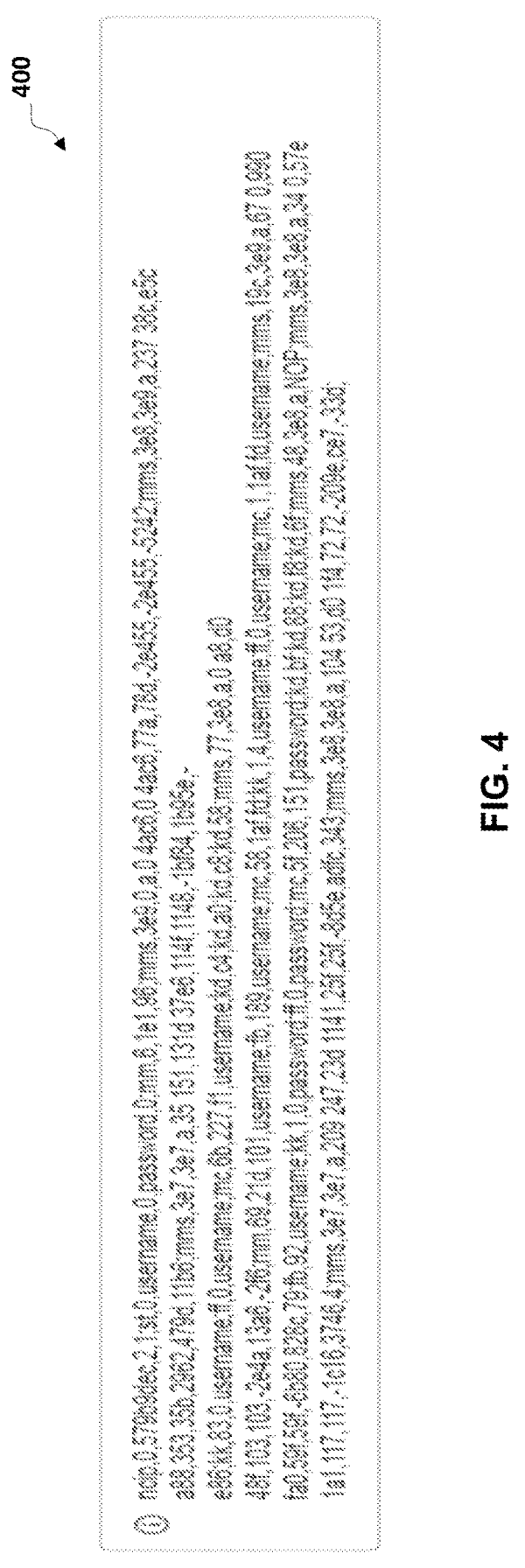

FIG. 4 is a diagram illustrating an example of an input profile record 400, in accordance with various aspects of the present disclosure. The input profile record (IPR) 400 is a transport mechanism that collects and verifies an end user's device interactions and behaviors. Interactions related to the users are captured and the use of their keyboard, mouse, motion and other interaction behaviors that can be extracted from the end user's device. In a typical integration, the IPR 400 is sent to the platform for processing, profiling, analysis and verification.

The device interaction events may be captured, for example, using a JavaScript Widget or Native Mobile SDKs, by hooking into application and/or platform based event callbacks that are available and compiles them into a text based data structure as illustrated in the IPR 400 of FIG. 4. The text based data structure is composed mainly of individual events separated by a token and concatenated into a string. Each event type may have a variable number of parameters to capture the details of that event type. Each parameter within an event is also separated by another token or sentinel value.

The server-side parsers are built to support any combination of input events as long as the header event, described below, is present. This enables IPR parsing to be forward compatible such that the parser will not cause any errors when the parser sees event types that it does not support. These events will be logged as "Unknown Events" and execute no special parsing rules.

When split on the event separator token (semi-colon character), the IPR 400 expands into an IPR 500. FIG. 5 is a diagram illustrating a second example of the IPR 500, in accordance with various aspects of the present disclosure.

TABLE 1

| | IPR Header Event Details The first event in the IPR 500 contains header information in the format of | | |
|---|---|---|---|
| Index | Title | Description | Example Value |
| 0 | Encoding Type | Set to ncip for all 2.2 IPRs. | ncip |
| 1 | Reserved | Reserved field, always zero | 0 |
| 2 | Unix Timestamp (base 16) | The unix time in seconds as recorded at the initialization of the JavaScript. Represented as base 16. | 538eb08a |
| 3 | Encoding Version (base 16) | Encoding version. Current versions are 1 and 2 and 3 (current) | 3 |
| 4 | Time Resolution (base 16) | The number of milliseconds in each time interval. Default is 10 (or 'a' in base 16). | a |

TABLE 2

| | IPR Common Event Details All other events, other than the header event, follow the base/common structure described in this table: | | |
|---|---|---|---|
| Index | Title | Type | Description |
| 0 | Event Type | string | An ID indicating the event type (reference the ID column in the next table) |
| 1 | Time Since Last Event (base 16) | string | The number of time intervals since the last event. The Time Resolution parameter provided in the header defines the number of milliseconds in each time interval. |
| 2 . . . N | Event_Type Parameter 1 . . . N | Mixed | Numbers are represented as base 16, otherwise string. 1 . . . N denotes a variable range of possible Event Type Parameters, where N is the total number of Event Type specific parameters. |

The following table describes each of the events and the associated data parameters they contain. These event specific parameters start after the "Time Since Last Event," as mentioned above in Table 2.

11 12

TABLE 3     TABLE 3-continued

IPR Events

| Identifier | Event | Event Parameters | Description |
|---|---|---|---|
| st | Form State | N pairs of: 1. DOM ID - Element ID/Name of the target field 2. Length - The current length of the input element when the state was logged. These pairs continue for each input field that are bound to and recording IPR data from | Logged each time the IPR widget initializes in the end user's browser. |
| ff | Form Field Focus | 1. ID - Element ID/Name of the target field | Sent when a user focuses an input field on the form. |
| fb | Form Field Blur | 1. ID - Element ID/Name of the target field | Sent when a user blurs (leaves focus) any type of HTML input field on the form. |
| kd | Key down | | Sent whenever a key down occurs. |
| ku | Key up | | Sent whenever a key up occurs. |
| mm | Mouse Move | 1. X - Horizontal position of the mouse 2. Y - Vertical position of the mouse | Sent at configurable frequency, providing mouse position, in pixels, relative to the top left of the document area. Default sample rate is every 5 seconds. |
| mc | Mouse Click | 1. X - Horizontal position of the mouse 2. Y - Vertical position of the mouse 3. ID - Element ID/Name that was clicked | Sent whenever the mouse is clicked on the page. |
| te | Touch Event | 1. X - Horizontal coordinate of the touch 2. Y - Vertical coordinate of the touch 3. ID - Element ID/Name that was touched | Sent whenever a touch start event occurs on the page. When available, the X and Y coordinate are the touch point relative to the viewport, including any scroll offset. These will be −1 if the touches page X and page Y properties are unavailable. |
| ac | Accelerometer | | For devices with accelerometer data. |
| fs | Form Submit | 1. X - Horizontal coordinate of the mouse 2. Y - Vertical coordinate of the mouse | A special event that is called before the post back occurs. Called for both 'Enter' pressed and button click. Passes in the mouse position at the time of event. |
| kk | Total Keys | 1. Length - The current length of the value of the element when it was focused. 2. ID - ElementID/Name that was focused | Triggers along with the FormFieldFocus(ff) event. This field is not currently used internally, but may be useful in the future so it has been restored in this encoding format document. This event type is still currently active in the JavaScript widget IPR. |
| sp | Scroll Position | | Determine if the page was scrolled or not and if so what position it's at on a configurable frequency. |
| nccl | Control List | | |
| ts | Time Sync | 1. Now - Current time in MS 2. Delta - Time since the IPR Init in MS | Logs a time sync every 15 seconds |
| mms | Mouse Movement Sample | 1. Time Since Last MMS 2. Number of sub samples taken 3. NOP or minVelocityX minVelocityY ** If the event is not a "NOP" event: 4. maxVelocityX maxVelocityY ** 5. Average Magnitude of Velocity 6. Total Distance Moved 7. Min Acceleration 8. Max Acceleration 9. Average Acceleration | Mouse Movement Data is cached any time the mouse is moved and samples of the movement are taken on configurable frequencies. Samples are made up of a number of sub-samples that collect and aggregate movement data to keep the payload small. The third (and last) parameter will hold the value "NOP" if no mouse activity was detected among the collection of sub-samples when a full sample is recorded. If mouse movement activity is detected for at least one sub-sample the full sample will be populated and provided to the IPR. ** Min and Max velocity are expressed as vectors separated by a space, since the comma is used for parameters. All numbers are represented as base 16 with the decimal shifted 4 places to the right to preserve accuracy of values below 0. All numerical units are expressed as Screens/ Second. Where a screen is the size of the window.screen.(width\|height) properties. |
| dms | Device Motion Sample | Same format as mms, but with 3 dimensions. Uses alpha/beta/gamma instead of x/y. 3. minVelocityAlpha minVelocityBeta minVelocityGamma 4. maxVelocityAlpha maxVelocityBeta maxVelocityGamma | The Device Motion Sample uses the same format and sampling implementation as mms. Devices return Alpha as 0 to 360 Alpha = DeviceAlpha Devices return Beta as −180 to 180 Beta = DeviceBeta + 180 Devices return Gamma as −90 to 90 Gamma = DeviceGamma + 90 Note in iOS pitch, roll, and yaw terminology is used by CoreMotion. They correlate as such: alpha - yaw beta - pitch gamma - roll |
| dm | Device Motion | 1. DeviceAlpha 2. DeviceBeta + 180 3. DeviceGamma + 90 | Sent at configurable frequency, providing device motion, in alpha/beta/gamma notation. Default sample rate is every 5 seconds. |

TABLE 3-continued

| | | IPR Events | |
|---|---|---|---|
| Identi-fier | Event | Event Parameters | Description |
| so | Stop | | Indicates that IPR recording was turned off using the widget "stop" function. |
| tr | Truncate | 1. Length of original IPR before truncation | Indicates that a truncation event has occurred. The truncated IPR is appended with a truncate event and data contains the original length of the IPR before it was truncated. |

The details above show no field identifier on key down events. The lack of a field identifier reduces the size of the IPR payload. When a form field focus event occurs, the following key down events are assumed to belong to that form field focus event. The parsing code however is set up to parse key down event entries that also contain an element name, for example, key down, bf (i.e., number of milliseconds since the last event in base 16), password. The key down events will contain the form identifier and so the behavior described above must be preserved if IPR parsing is changed.

Figures 6, 7:
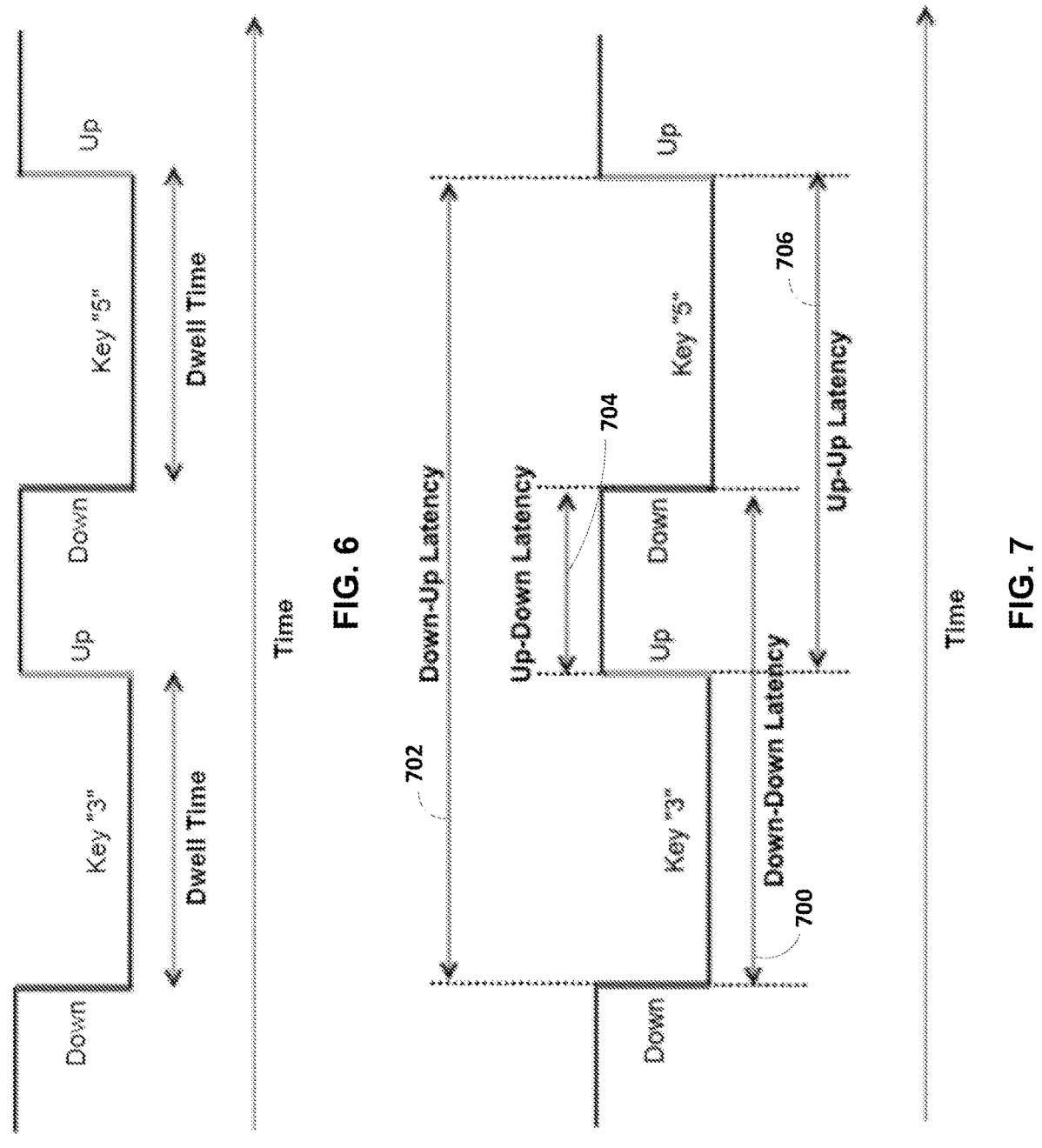
FIG. 6 is a diagram illustrating a first example of a dwell time feature, in accordance with various aspects of the present disclosure.
FIG. 7 is a diagram illustrating four different latency times, in accordance with various aspects of the present disclosure.

Since key up event capture and enhanced key down profiling were added for both desktop and mobile IPRs, additional features could generally apply for both physical and touch keyboards, although there would be feature implementation differences based on differences in desktop IPR data and mobile IPR data. For example, FIG. 6 is a diagram illustrating a first example of a dwell time feature 600, in accordance with various aspects of the present disclosure.

The dwell time feature 600 is an amount of time during which a key (physical or software) remains in contact (down/up for physical and press/release for software) with a user. As illustrated in FIG. 6, the dwell time feature 600 includes a first down press 600, a first dwell time 602, a first up release 604, a second down press 606, a second dwell time 608, and a second up release 610. In the IPRs 400 and 500 described above, time elements are in time deltas (time since last event), rather than timestamps.

TABLE 4

| | | Characteristics of Dwell Time Feature | |
|---|---|---|---|
| # | Feature Name | Feature Description | Feature Type |
| 1 | Each of these are individual features: otp_otp_dwell_1 otp_otp_dwell_2 otp_otp_dwell_3 otp_otp_dwell_4 otp_otp_dwell_5 otp_otp_dwell_6 | Dwell time for each position (i.e., 1, 2, 3, 4, 5, 6) in the one-time password (OTP) sequence. A difference in performance is noted when the position of a digit within an OTP sequence is included for key press durations and latencies. | Numeric |
| 2 | total_dwell | Total dwell time for the OTP sequence (sum of dwell times for all keys pressed when inputting the OTP) SUM(otp_position1_dwell, otp_position2_dwell, otp_position3_dwell, | Numeric |

TABLE 4-continued

| | | Characteristics of Dwell Time Feature | |
|---|---|---|---|
| # | Feature Name | Feature Description | Feature Type |
| | | otp_position4_dwell, otp_position5_dwell, otp_position6_dwell) | |
| 3 | total_dwell_to_dd | Proportion of total dwell time relative to total down-down latency, (total_dwell − otp_position6_dwell)/total_dd_time Since the last key does not have an associated down-down time, the last key is excluded from the calculation. | Numeric |
| 4 | total_dwell_to_uu | Proportion of total dwell time relative to total up-up latency. (total_dwell − otp_position1_dwell)/total_uu_time Since the first key does not have an associated up-up time, the first key is excluded from the calculation. | Numeric |
| 5 | mean_dwell | Average dwell time (of a single key) for the OTP sequence | Numeric |
| 6 | max_dwell | Longest dwell time in the OTP sequence | Numeric |
| 7 | min_dwell | Shortest dwell time in the OTP sequence | Numeric |
| 8 | std_dwell | Standard deviation of dwell times for the OTP sequence | Numeric |
| 9 | Each of these are individual features: dwell_to_dd1 dwell_to_dd2 dwell_to_dd3 dwell_to_dd4 dwell_to_dd5 | Proportion of dwell time relative to down-down latency (see "Latency" section below for definition) for each key pressed.* For example: otp_position1_dwell/dd1 *Since the last key pressed does not have an associated down-down latency, there are only 5 down-down latencies in a 6-digit OTP, so the last key pressed would not have this feature. | Numeric |
| 10 | mean_dwell_to_dd | Average proportion of dwell time relative to down-down latency across all keys pressed. AVG(dwell_to_dd1, dwell_to_dd2, dwell_to_dd3, dwell_to_dd4, dwell_to_dd5) | Numeric |
| 11 | std_dwell_to_dd | Standard deviation of proportion of dwell time relative to down-down latency across all keys pressed. STD(dwell_to_dd1, dwell_to_dd2, dwell_to_dd3, dwell_to_dd4, dwell_to_dd5) | Numeric |
| 12 | Each of these are individual features: dwell_to_uu1 dwell_to_uu2 dwell_to_uu3 dwell_to_uu4 dwell_to_uu5 | Proportion of dwell time relative to up-up latency (see "Latency" section below for definition) for each key pressed.* For example: otp_position2_dwell/uu1 | Numeric |

TABLE 4-continued

| | | Characteristics of Dwell Time Feature | | | |
|---|---|---|---|---|---|
| # | Feature Name | Feature Description | Feature Type |
| | | *Since the first key pressed does not have an associated up-up latency, there are only 5 up-up latencies in a 6-digit OTP, so the first key pressed would not have this feature. | |
| 13 | mean_dwell_to_uu | Average proportion of dwell time relative to up-up latency across all keys pressed. AVG(dwell_to_uu1, dwell_to_uu2, dwell_to_uu3, dwell_to_uu4, dwell_to_uu5) | Numeric |
| 14 | std_dwell_to_uu | Standard deviation of proportion of dwell time relative for up-up latency across all keys pressed. STD(dwell_to_uu1, dwell_to_uu2, dwell_to_uu3, dwell_to_uu4, dwell_to_uu5) | Numeric |

Another aspect of the dwell time feature 600 is latency, which is an amount of time between consecutive keystrokes, where keystroke is a pair of key events involving a press and release of a single key. Latency may be broken into four different types: 1) Down-Down, 2) Up-Down, 3) Up-Up, and 4) Down-Up. FIG. 7 is a diagram illustrating four different latency times 700-706, in accordance with various aspects of the present disclosure. The first latency 700 is the down-down latency that is the amount of time between pressing a key and pressing the next key. The second latency 702 is the down-up latency that is the amount of time between pressing a key and releasing the next key. The third latency 704 is the up-down latency (also known as "Flight Time") that is the amount of time between releasing a key and pressing the next key. The fourth latency 706 is the up-up latency that is the amount of time between releasing a key and releasing the next key.

Generally, dwell time is positive because keystrokes follow a down-up-down-up pattern. However, in some instances, dwell time may be negative when the sequence of keystrokes does not follow the down-up-down-up pattern (for example, due to fast typing or use of shift keys).

Figures 8, 9:
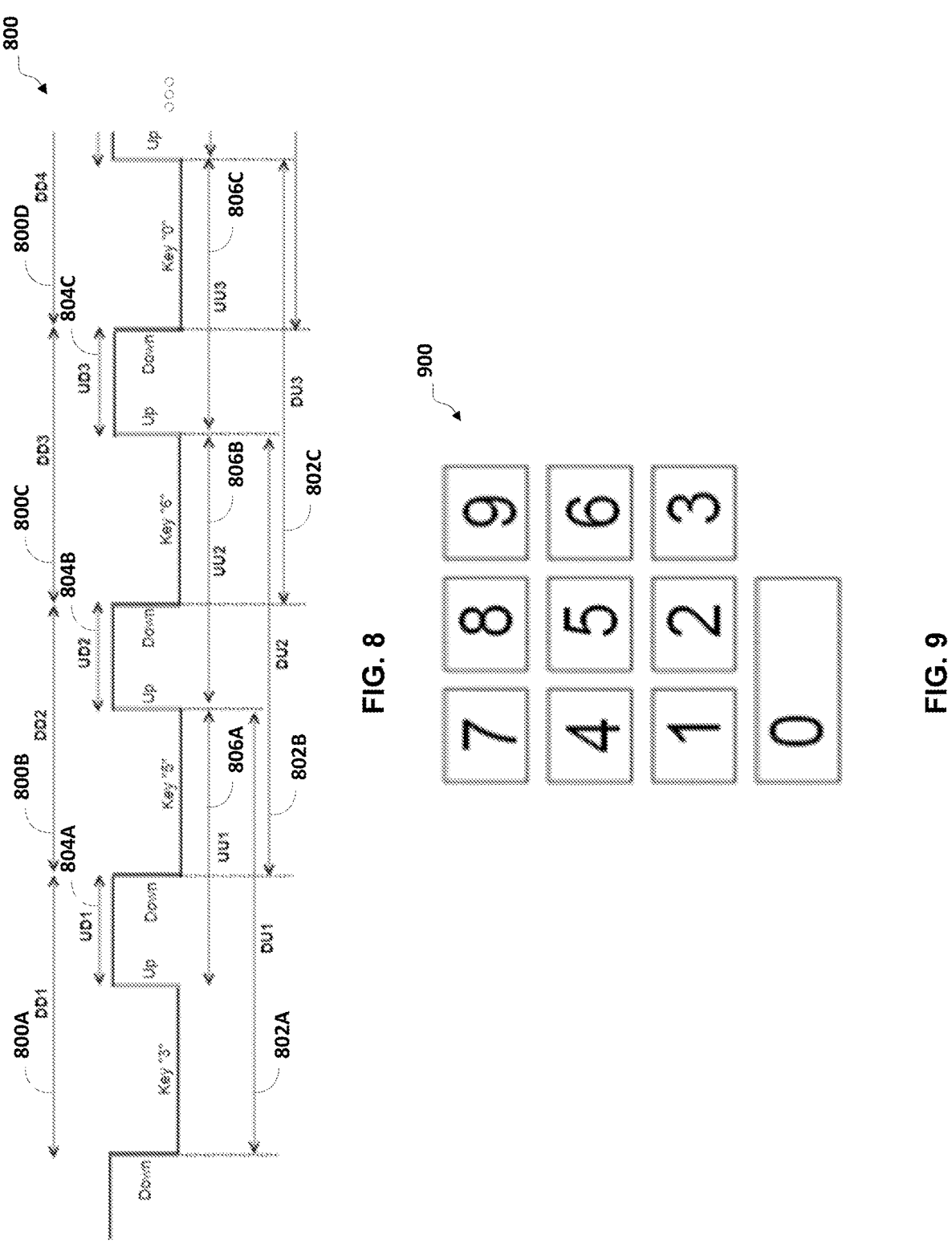
FIG. 8 is a diagram illustrating different latency times for a portion of an example OTP "356024," in accordance with various aspects of the present disclosure.
FIG. 9 is a block diagram illustrating a standard number pad layout, in accordance with various aspects of the present disclosure.

For the example OTP "356024," the server 100 may determine each type of latency time for all diagraphs (a diagraph being two consecutive keystrokes). FIG. 8 is a diagram illustrating different latency times 800-806 for a portion of an example OTP "356024," in accordance with various aspects of the present disclosure. As illustrated in FIG. 8, the portion of the example OTP "356024" is "3560" and includes down-down latencies 800A-800D, down-up latencies 802A-802C, up-down latencies 804A-804C, and up-up latencies 806A-806C.

TABLE 5

| | | Dwell Time Latency Features | | | |
|---|---|---|---|---|
| # | Feature Name | Feature Description | Feature Type | Consideration |
| 1 | Down-Down (dd) latency. Each of these are individual features: dd1 dd2 dd3 dd4 dd5 | Amount of time between pressing a key and pressing the next key for each digraph in the OTP sequence. With the example OTP 356024, there are 5 total digraphs where each digraph corresponds to a transition between the following pairs of keys: Digraph 1: (3, 5) Digraph 2: (5, 6) Digraph 3: (6, 0) Digraph 4: (0, 2) Digraph 5: (2, 4) | Numeric | |
| 2 | Up-Up (uu) latency. Each of these are individual features: uu1 uu2 uu3 uu4 uu5 | Amount of time between releasing a key and releasing the next key for each digraph in the OTP sequence | Numeric | |
| 3 | Up-Down (ud) latency. Each of these are individual features: ud1 ud2 ud3 ud4 ud5 | Amount of time between releasing a key and pressing the next key for each digraph in the OTP sequence | Numeric | |
| 4 | Down-Up (du) latency Each of these are individual features: du1 du2 du3 | Amount of time between pressing a key and releasing the next key for each digraph in the OTP sequence | Numeric | |

TABLE 5-continued

| | | Dwell Time Latency Features | | |
|---|---|---|---|---|
| # | Feature Name | Feature Description | Feature Type | Consideration |
| | du4 du5 | | | |
| 5 | total_x_time where x in [dd, uu, ud, du] | Total dd, uu, ud, or du time in the OTP sequence | Numeric | Error corrections will make this a larger number - for all features, it would be simpler to only use samples where OTP was inputted without any error |
| 6 | mean_x_time where x in [dd, uu, ud, du] | Average dd, uu, ud or du time in the OTP sequence | Numeric | |
| 7 | min_x_time where x in [dd, uu, ud, du] | Shortest dd, uu, ud or du time in the OTP sequence | Numeric | |
| 8 | max_x_time where x in [dd, uu, ud, du] | Longest dd, uu, ud or du time in the OTP sequence | Numeric | |
| 9 | std_x_time where x in [dd, uu, ud, du] | Standard deviation of dd, uu, ud or du times in the OTP sequence | Numeric | |
| 10 | otp_position_max_ud_time | The position in the OTP sequence of the key which precedes the longest up-down (flight) time (e.g. longest pause comes after the 2nd digit is typed) and may be further extended to max 1, max 2, max 3 . . . i.e. position of key preceding longest flight time, position of key preceding second longest flight time, etc. ← This may help characterize how users have different rhythms when inputting an OTP (e.g. 3 + 3 = type first 3 digits, small pause, then types next 3 digits - other patterns like 2 + 2 + 2 are also possible) | Numeric - discrete (range 1-6) | Error corrections (if made) might make it trickier to determine the position |

Figures 10, 11:
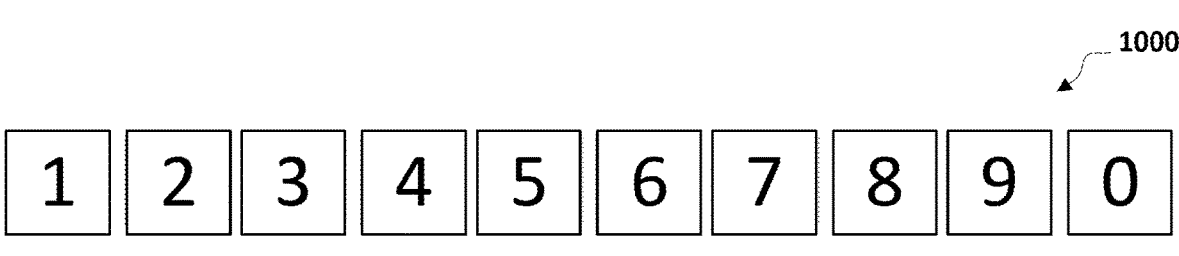
FIG. 10 is block diagram illustrating a standard number row layout, in accordance with various aspects of the present disclosure.
FIG. 11 is diagram illustrating different categories of distances between number positions in the standard number pad layout of FIG. 9, in accordance with various aspects of the present disclosure.

In some examples, the actual OTP assigned may be known in advance and whether the OTP typed was correct/accepted. In these examples, the location/layout structure of the keyboard gives rise to three additional latency features: 1) latency for specific pairs of keys, 2) latencies for distance categories based on a standard number pad layout, and 3) latencies for distance categories based on a standard number row layout. FIG. 9 is a block diagram illustrating a standard number pad layout 900, in accordance with various aspects of the present disclosure. FIG. 10 is block diagram illustrating a standard number row layout 1000, in accordance with various aspects of the present disclosure. FIG. 11 is diagram illustrating different categories 1100-1114 of distances between number positions in the standard number pad layout 900 of FIG. 9, in accordance with various aspects of the present disclosure.

TABLE 6

| | | Latency Time Features |
|---|---|---|
| # | Feature Name | Feature Description |
| 1 | Latencies for specific pairs of keys | Each of these are individual features: pair_00_x pair_01_x pair_02_x . . . pair_99_x (100 total) where x in [dd, uu, ud, du] |

TABLE 6-continued

| | | |
|---|---|---|
| | | Latency Time Features |

| Feature # | Feature Name | Feature Description |
|---|---|---|
| | | Given 10 possible digits, there are 10 × 10 = 100 possible combinations that exist in an OTP: <br> (0, 0) <br> (0, 1) <br> (0, 2) <br> . . . <br> (9, 9) <br> For the example OTP 356024, the 5 pairs would be: (3, 5), (5, 6), (6, 0), (0, 2), (2, 4) <br> The server may then determine, for example, the up-down time for each of these pairs and fill those 100, leaving the pairs which are not applicable in this OTP entry. |
| 2 | Latencies for distance categories based on a standard number pad layout. | Each of these are individual features: <br> numpad_pair_cat1_x <br> numpad_pair_cat2_x <br> . . . <br> numpad_pair_cat_8_x <br> (8 total) <br> where x in [dd, uu, ud, du] <br> Assuming, for example, that the latency between 7 and 9 is comparable to the latency between 7 and 1 since they are equally as far apart on the number pad. Each of the 100 pairs of digits categorized into 8 different categories of distances (see FIG. 11), and latencies are calculated only within multiple latencies between pairs exist within the same category for an OTP. Assuming for, example, that the latency between 7 and 9 is comparable to the latency between 4 and 6 or between 7 and 1 since they are equally as far apart on the number pad. Each of the 100 pairs of digits above are therefore categorized into 8 different categories of distances, and latencies are calculated only within these 8 categories. Where multiple latencies between pairs exist within the same category for an OTP, the latencies are averaged to produce one latency value for the category. |
| 3 | Latencies for distance categories based on a standard number row layout. | Each of these are individual features: <br> numrow_pair_cat1_x <br> numrow_pair_cat2_x <br> . . . <br> numrow_pair_cat_10_x <br> (10 total) <br> where x in [dd, uu, ud, du] <br> Assuming, for example, that the latency between 1 and 3 is comparable to the latency be and 7 since they are equally as far apart on the number pad. Each of the 100 pairs of digits categorized into 10 different categories of distances, and latencies are calculated only with where multiple latencies between pairs exist within the same category for an OTP. Assuming for, example, that the latency between 1 and 3 is comparable to the latency between 2 and 4 or between 5 and 7 since they are equally as far apart on the number pad. Each of the 100 pairs of digits above are therefore categorized into 10 different categories of distances, and latencies are calculated only within these 10 categories. Where multiple latencies between pairs exist within the same category for an OTP, the latencies are averaged to produce one latency value for the category. |

TABLE 7

| | | | |
|---|---|---|---|
| | | | Miscellaneous Keystroke Dynamics |

| Feature # | Feature Name | Feature Description | Feature Type | Considerations |
|---|---|---|---|---|
| 1 | total_kd | Total number of key presses (key down events) in the OTP sequence | Numeric - discrete | Considering our expected OTP codes are 6 digits in length, this should be at least 6. More kd's may indicate errors or error correction, and fewer kd's may indicate use of |

TABLE 7-continued

Miscellaneous Keystroke Dynamics

| # | Feature Name | Feature Description | Feature Type | Considerations |
|---|---|---|---|---|
| | | | | keyboard shortcuts (e.g. copy and paste, which should be flagged/disqualified). Error corrections will make this a larger number - for all features, it would be simpler to only use samples where OTP was inputted without any error. |
| 2 | numeric_kd_to_total_kd | Proportion of total number of key down events where a numeric key was pressed | Numeric | If error correction cases are excluded and there is no shift use, this ratio should be 1 most of the time for desktop keyboards. For mobile touch keyboards however, there could be a lot more touch events not for inputting numeric values (e.g. scrolling/flicking up and down). |
| 3 | total_edit_kd | Total number of times an editing key was used in the OTP sequence (i.e. number of kd's on backspace, delete, insert regardless of keyboard location) | Numeric | Uses new keyboard location profiling of kd events in IPR |
| 4 | edit_kd_to_total_kd | Proportion of total number of key down events where an editing key was pressed | Numeric | This would be 0 most of the time if excluded in error correction cases |
| 5 | numpad_ind | Indicates whether a full keyboard containing a numpad was used (at least one key was pressed where numpad location was indicated) | Binary | |

The mobile sensor data may be collected, for example, using a JavaScript widget or Native Mobile SDKs from four sensors that capture orientation, rotation, and acceleration data (both with and without the effect of gravity) in three dimensions. In some examples, the sensor events are not aggregated and may be driven at a sixteen millisecond (ms) rate.

TABLE 7

Mobile Sensor Features

| # | Feature Name | Feature Description | Feature Type |
|---|---|---|---|
| 1 | avg_sensor_value_x avg_sensor_value_y avg_sensor_value_z | Average sensor value for each axis | Numeric |
| 2 | med_sensor_value_x med_sensor_value_y med_sensor_value_z | median sensor value for each axis | Numeric |
| 3 | mean_med_ratio_sensor_value_x mean_med_ratio_sensor_value_y mean_med_ratio_sensor_value_z | mean to median sensor value ratio for each axis | Numeric |

TABLE 7-continued

Mobile Sensor Features

| # | Feature Name | Feature Description | Feature Type |
|---|---|---|---|
| 4 | std_sensor_value_x std_sensor_value_y std_sensor_value_z | Std deviation of sensor values for each axis | Numeric |
| 5 | coefvar_sensor_value_x coefvar_sensor_value_y coefvar_sensor_value_z | coef. of variation of sensor values for each axis | Numeric |
| 6 | avg_abs_diff_x avg_abs_diff_y avg_abs_diff_z | Average absolute difference between each of the sensor readings and their mean for each axis | Numeric |
| 7 | iqr_sensor_value_x iqr_sensor_value_y iqr_sensor_value_z | Interquartile range sensor value for each axis | Numeric |
| 8 | avg_result_acceleration | the average of the square root of the sum of the square of the x, y, z axis values | Numeric |
| 9 | binned_distrib_x_i binned_distrib_y_i binned_distrib_z_i | for i from 1 to n determine the range of values for each axis (max − min), divide this range into n equal sized bins, and then record what fraction of the sensor values fell within each of the bins. Note: here n is a parameter. Usually n = 10 | Numeric |
| 10 | n_peaks_norm_x n_peaks_norm_y n_peaks_norm_z | Number of the peaks for each axis normalized by the total session time (usually the sensor time series, similarly to other signal data, looks like repetitive ways on the graph, e.g. sinusoid. In this case, the server computes the number of those waves for each axis). The server may also define a threshold value that defines a peak, e.g. discard small peaks. | Numeric - discrete |
| 11 | range_peak_x range_peak_y range_peak_z | The difference between max and min peak values for each axis. Note: The server may also use ratio. | Numeric |
| 12 | avg_peak_x avg_peak_y avg_peak_z | Average peak value for each axis | Numeric |
| 13 | avg_time_bw_peaks_x avg_time_bw_peaks_y avg_time_bw_peaks_z | Average time between peaks for each axis. Note: this feature assumes that there's more than one peak. If there's no distinguishable peaks based on the threshold in 9, then the server may lower the threshold or compute the average time between first n maximum values for each axis, where n is a parameter | Numeric |

TABLE 8

Mobile Sensor Events

| ID | Event | Custom Data Parameters | Description |
|---|---|---|---|
| ac | devicemotion.acceleration IncludingGravity | 1. Represents the acceleration upon the x axis which is the west to east axis 2. Represents the acceleration upon the y axis which is the south to north axis 3. Represents the acceleration upon the z axis which is the down to up axis NOP is device is stationary | Acceleration of the device on the three axis X, Y and Z with the effect of gravity. Acceleration is expressed in m/s2 |

TABLE 8-continued

| | | Mobile Sensor Events | |
|---|---|---|---|
| ID | Event | Custom Data Parameters | Description |
| gy | devicemotion.rotationRate | 1. The rate at which the device is rotating about its Z axis; that is, being twisted about a line perpendicular to the screen. 2. The rate at which the device is rotating about its X axis; that is, front to back. 3. The rate at which the device is rotating about its Y axis; that is, side to side. NOP is device is stationary | Rate of change of the device's orientation on the three orientation axis alpha, beta and gamma. Rotation rate is expressed in degrees per seconds. |
| lac | devicemotion.acceleration | 1. Represents the acceleration upon the x axis which is the west to east axis 2. Represents the acceleration upon the y axis which is the south to north axis 3. Represents the acceleration upon the z axis which is the down to up axis NOP is device is stationary | Acceleration of the device on the three axis X, Y and Z. Acceleration is expressed in $m/s2$ |
| or | deviceorientationevent | 1. a number representing the motion of the device around the z axis, express in degrees with values ranging from 0 to 360. 2. a number representing the motion of the device around the x axis, express in degrees with values ranging from −180 to 180. This represents a front to back motion of the device 3. a number representing the motion of the device around the y axis, express in degrees with values ranging from −90 to 90. This represents a left to right motion of the device 4. a boolean that indicates whether or not the device is providing orientation data absolutely - this value is optional, true if provided. NOP is device is stationary | Information from the physical orientation of the device running the web page or mobile application |

One example sampling frequency used for the data collection described above is 62.5 hertz (Hz) (i.e., sensor events driven every sixteen milliseconds). However, the sensor events are stored in the IPR (e.g., the IPR 400 or the IPR 500) and the resulting size of the IPR may exceed a desired threshold (e.g., 20,000 bytes maximum, more preferably, 5 kB).

After collecting data every 16 ms, the mobile sample resulted in 167,017 observations and a mean of 29,000 bytes. In order the meet the recommended production IPR size of approximately 5 kB, then the IPR must be approximately six times smaller. With the sensor data consuming more than 90% of the IPR size, then the sensor sampling rate must be at least six times slower than the current 16 ms or roughly 100 ms (10 events per second). With the sensor sampling rate set to 100 ms, more than 99% of IPRs will not require truncation and the average IPR would be approximately 5,000 bytes.

Alternatively, in some examples, instead of setting the sensor sampling rate to 100 ms, the number of sensors collecting data may be reduced (e.g., remove gravity accelerator) and the sensor sampling rate may be set at a more accurate 50 ms sampling rate. In these examples, the data collection is most accurate when using higher sampling rates for sensors that do not have much short time variation (e.g., gyroscope and orientation).

Thus, the present disclosure provides, among other things, user identification based on an input profile record. Various features and advantages of the invention are set forth in the following claims.

What is claimed is:

1. A server comprising:
a memory including an input profile record repository; and
an electronic processor in communication with the memory, the electronic processor configured to
receive a plurality of historical input profile records (IPRs) associated with a first user using a first user interface of a first one or more computing devices, each of the plurality of historical IPRs based on a first plurality of user inputs and indicative of an identity of the first user, wherein the first plurality of user inputs is user inputs of a first password entered on a first layout of the first user interface, and wherein each user input of the user inputs includes a key up event and a key down event of each key in the first password relative to the first layout of the first user interface,
control the memory to store the plurality of historical IPRs in the input profile record repository,
receive a current IPR associated with a second user using a second user interface of a second computing device, the current IPR based on a second plurality of user inputs and indicative of an identity of the second user, wherein the second plurality of user inputs is a second password entered on a second layout of the second user interface, and wherein each user input of the second plurality of user inputs includes a key up event and a key down event of each key in the second password relative to the second layout of the second user interface, generate, with a biometric identification algorithm, a first one or more biometric features based on the plurality of historical IPRs stored in the memory and a second one or more biometric features based on the current IPR, determine whether the second user is the first user by comparing the first one or more biometric features and the second one or more biometric features to each other, and responsive to determining that the second user is the first user, output an identity confirmation that the second user is the first user, wherein the second computing device is separate and distinct from the first one or more computing devices, wherein the second user interface is separate and distinct from the first user interface, wherein the second layout is different from the first layout, and wherein, to generate, with the biometric identification algorithm, the first one or more biometric features based on the plurality of historical IPRs and the second one or more biometric features based on the current IPR, the electronic processor is further configured to determine a first one or more latencies of specific pairs of keys based on the plurality of historical IPRs, determine a second one or more latencies of the specific pairs of keys based on the current IPR, determine a first one or more latencies of first distance categories based on the plurality of historical IPRs, determine a second one or more latencies of the first distance categories based on the current IPR, determine a first one or more latencies of second distance categories based on the plurality of historical IPRs, and determine a second one or more latencies of the second distance categories based on the current IPR.

2. The server of claim 1, wherein, to determine whether the second user is the first user by comparing the first one or more biometric features and the second one or more biometric features to each other, the electronic processor is further configured to generate, with the biometric identification algorithm, a biometric score based on difference between the second one or more biometric features and the first one or more biometric features, determine whether the biometric score is less than a lower threshold, determine whether the biometric score greater than the lower threshold and less than an upper threshold, and determine whether the biometric score is greater than the lower threshold and the upper threshold, and wherein the second user is determined to be the first user in response to determining that the biometric score is greater than the lower threshold and the upper threshold.

3. The server of claim 2, wherein the second user is determined to not be the first user in response to determining that the biometric score is lower than the lower threshold and the upper threshold, and wherein the second user is undetermined relative to the first user in response to determining that the biometric score is higher than the lower threshold and lower than the upper threshold.

4. The server of claim 1, wherein the plurality of historical IPRs and the current IPR each include an IPR header and a plurality of IPR events, wherein the plurality of IPR events includes a plurality of key down events and a plurality of key up events, and wherein the first password is a one-time-password (OTP).

5. The server of claim 1, wherein the plurality of historical IPRs and the current IPR each include an IPR header and a plurality of IPR events, and wherein the plurality of IPR events includes two or more of:

a form state event, a form field focus event, a form field blur event, a key down event, a key up event, a mouse move event, a mouse click event, a touch event, an accelerometer event, a form submit event, a total keys event, a scroll position event, a control list event, a time sync event, a mouse movement sample event, a device motion sample event, a device motion event, a stop event, and a truncate event.

6. The server of claim 1, wherein the first one or more biometric features and the second one or more biometric features each include a plurality of sensor features including two or more of:

average sensor value for each axis, median sensor value for the each axis, mean to median sensor value ratio for the each axis, standard deviation of sensor values for the each axis, coefficient of variation of sensor values for the each axis, average absolute difference between sensor readings and the mean for the each axis, interquartile range sensor value for the each axis, an average of a square root of a sum of a square of x, y, z axis values, binned distribution for the each axis, number of peaks for the each axis normalized by total session time, difference between maximum and minimum peak values for the each axis, average peak value for the each axis, and average time between the peaks for the each axis.

7. The server of claim 1, wherein the first user interface is one of a first physical user interface or a first virtual user interface, wherein the second user interface is one of a second physical user interface or a second virtual user interface, wherein, when the second user interface is the second virtual user interface, the first user interface is the first physical user interface, and wherein, when the second user interface is the second physical user interface, the first user interface is the first virtual user interface.

8. A method for user identification, the method comprising:

receiving, with an electronic processor, a plurality of historical input profile records (IPRs) associated with a first user using a first user interface of a first one or more computing devices, each of the plurality of historical IPRs based on a first plurality of user inputs and indicative of an identity of the first user, wherein the first plurality of user inputs is user inputs of a first password entered on a first layout of the first user interface, and wherein each user input of the user inputs includes a key up event and a key down event of each key in the first password relative to the first layout of the first user interface;

controlling, with the electronic processor, a memory to store the plurality of historical IPRs in an input profile record repository;

receiving, with the electronic processor, a current IPR associated with a second user using a second user interface of a second computing device, the current IPR based on a second plurality of user inputs and indicative of an identity of the second user, wherein the second plurality of user inputs is a second password entered on a second layout of the second user interface, and wherein each user input of the second plurality of user inputs includes a key up event and a key down event of each key in the second password relative to the second layout of the second user interface;

generating, with the electronic processor and a biometric identification algorithm, a first one or more biometric features based on the plurality of historical IPRs stored in the memory and a second one or more biometric features based on the current IPR;

determining, with the electronic processor, whether the second user is the first user by comparing the first one or more biometric features and the second one or more biometric features; and responsive to determining that the second user is the first user, outputting, with the electronic processor, an identity confirmation that the second user is the first user, wherein the second computing device is separate and distinct from the first one or more computing devices, wherein the second user interface is separate and distinct from the first user interface, wherein the second layout is different from the first layout, wherein, generating, with the biometric identification algorithm, the first one or more biometric features based on the plurality of historical IPRs and the second one or more biometric features based on the current IPR further includes determining a first one or more latencies of specific pairs of keys based on the plurality of historical IPRs, determining a second one or more latencies of the specific pairs of keys based on the current IPR, determining a first one or more latencies of first distance categories based on the plurality of historical IPRs, determining a second one or more latencies of the first distance categories based on the current IPR, determining a first one or more latencies of second distance categories based on the plurality of historical IPRs, and determining a second one or more latencies of the second distance categories based on the current IPR.

9. The method of claim 8, wherein determining whether the second user is the first user by comparing the first one or more biometric features and the second one or more biometric features includes

30 generating, with the biometric identification algorithm, a biometric score based on difference between the second one or more biometric features and the first one or more biometric features, determining whether the biometric score is less than a lower threshold, determining whether the biometric score greater than the lower threshold and less than an upper threshold, and determining whether the biometric score is greater than the lower threshold and the upper threshold, and wherein the second user is determined to be the first user in response to determining that the biometric score is greater than the lower threshold and the upper threshold.

10. The method of claim 9, wherein the second user is determined to not be the first user in response to determining that the biometric score is lower than the lower threshold and the upper threshold, and wherein the second user is undetermined relative to the first user in response to determining that the biometric score is higher than the lower threshold and lower than the upper threshold.

11. The method of claim 8, wherein the plurality of historical IPRs and the current IPR each include an IPR header and a plurality of IPR events, wherein the plurality of IPR events includes a plurality of key down events and a plurality of key up events, wherein the first password is a one-time-password (OTP).

12. The method of claim 8, wherein the plurality of historical IPRs and the current IPR each include an IPR header and a plurality of IPR events, and wherein the plurality of IPR events includes two or more of:

a form state event, a form field focus event, a form field blur event, a key down event, a key up event, a mouse move event, a mouse click event, a touch event, an accelerometer event, a form submit event, a total keys event, a scroll position event, a control list event, a time sync event, a mouse movement sample event, a device motion sample event, a device motion event, a stop event, and a truncate event.

13. The method of claim 8, wherein the first one or more biometric features and the second one or more biometric features each include a plurality of sensor features including two or more of:

average sensor value for each axis, median sensor value for the each axis, mean to median sensor value ratio for the each axis, standard deviation of sensor values for the each axis, coefficient of variation of sensor values for the each axis, average absolute difference between sensor readings and the mean for the each axis, interquartile range sensor value for the each axis, an average of a square root of a sum of a square of x, y, z axis values, binned distribution for the each axis, number of peaks for the each axis normalized by total session time, difference between maximum and minimum peak values
for the each axis, average peak value for the each axis, and average time between the peaks for the each axis.

14. The method of claim 8, wherein the first user interface is one of a first physical user interface or a first virtual user interface, wherein the second user interface is one of a second physical user interface or a second virtual user interface, wherein, when the second user interface is the second virtual user interface, the first user interface is the first physical user interface, and wherein, when the second user interface is the second physical user interface, the first user interface is the first virtual user interface.

15. A system comprising:

a user interface device configured to output a plurality of historical input profile records (IPRs) associated with a first user using a first user interface of the user interface device, each of the plurality of historical IPRs based on a first plurality of user inputs and indicative of an identity of the first user, wherein the first plurality of user inputs is user inputs of a first password entered on a first layout of the first user interface, and wherein each user input of the user inputs includes a key up event and a key down event of each key in the first password relative to the first layout of the first user interface; and a server including a memory including an input profile record repository; and an electronic processor in communication with the memory, the electronic processor configured to receive the plurality of historical IPRs, control the memory to store the plurality of historical IPRs in the input profile record repository, receive a current IPR associated with a second user using a second user interface of a second computing device, the current IPR based on a second plurality of user inputs and indicative of an identity of the second user, wherein the second plurality of user inputs is a second password entered on a second layout of the second user interface, and wherein each user input of the second plurality of user inputs includes a key up event and a key down event of each key in the second password relative to the second layout of the second user interface, generate, with a biometric identification algorithm, a first one or more biometric features based on the plurality of historical IPRs stored in the memory and a second one or more biometric features based on the current IPR, determine whether the second user is the first user by comparing the first one or more biometric features and the second one or more biometric features, and responsive to determining that the second user is the first user, output an identity confirmation that the second user is the first user, wherein the second computing device is separate and distinct from the user interface device, wherein the second user interface is separate and distinct from the first user interface, wherein the second layout is different from the first layout, and wherein, to generate, with the biometric identification algorithm, the first one or more biometric features based on the plurality of historical IPRs and the second one or more biometric features based on the current IPR, the electronic processor is further configured to determine a first one or more latencies of specific pairs of keys based on the plurality of historical IPRs, determine a second one or more latencies of the specific pairs of keys based on the current IPR, determine a first one or more latencies of first distance categories based on the plurality of historical IPRs, determine a second one or more latencies of the first distance categories based on the current IPR, determine a first one or more latencies of second distance categories based on the plurality of historical IPRs, and determine a second one or more latencies of the second distance categories based on the current IPR.

16. The system of claim 15, wherein, to determine whether the second user is the first user by comparing the first one or more biometric features and the second one or more biometric features, the electronic processor is further configured to generate, with the biometric identification algorithm, a biometric score based on difference between the second one or more biometric features and the first one or more biometric features, determine whether the biometric score is less than a lower threshold, determine whether the biometric score greater than the lower threshold and less than an upper threshold, and determine whether the biometric score is greater than the lower threshold and the upper threshold, and wherein the second user is determined to be the first user in response to determining that the biometric score is greater than the lower threshold and the upper threshold.

17. The system of claim 16, wherein the second user is determined to not be the first user in response to determining that the biometric score is lower than the lower threshold and the upper threshold, and wherein the second user is undetermined relative to the first user in response to determining that the biometric score is higher than the lower threshold and lower than the upper threshold.

18. The system of claim 15, wherein the plurality of historical IPRs and the current IPR each include an IPR header and a plurality of IPR events, wherein the plurality of IPR events includes a plurality of key down events and a plurality of key up events, wherein the first password is a one-time-password (OTP).

19. The system of claim 15, wherein the plurality of historical IPRs and the current IPR each include an IPR header and a plurality of IPR events, and wherein the plurality of IPR events includes two or more of:

a form state event, a form field focus event, a form field blur event, a key down event, a key up event, a mouse move event, a mouse click event, a touch event, an accelerometer event, a form submit event, a total keys event, a scroll position event, a control list event,
a time sync event,
a mouse movement sample event,
a device motion sample event,
a device motion event,
a stop event, and
a truncate event.

20. The system of claim 15, wherein the first user interface is one of a first physical user interface or a first virtual user interface, wherein the second user interface is one of a second physical user interface or a second virtual user interface, wherein, when the second user interface is the second virtual user interface, the first user interface is the first physical user interface, and wherein, when the second user interface is the second physical user interface, the first user interface is the first virtual user interface.

* * * * *